United States Patent [19]

Yamauchi et al.

[11] Patent Number: 4,550,054
[45] Date of Patent: Oct. 29, 1985

[54] MAGNETIC RECORDING MEDIUM

[75] Inventors: Yasuhisa Yamauchi, Hino; Masao Asano, Tokyo; Mitsutaka Arai, Hachioji, all of Japan

[73] Assignee: Konishiroku Photo Industry Co., Ltd., Tokyo, Japan

[21] Appl. No.: 545,960

[22] Filed: Oct. 27, 1983

[30] Foreign Application Priority Data

Oct. 29, 1982 [JP] Japan ................................. 57-190273
Nov. 8, 1982 [JP] Japan ................................. 57-195605

[51] Int. Cl.$^4$ ............................................... G11B 5/70
[52] U.S. Cl. .................................... 428/328; 428/329;
428/403; 428/413; 428/423.1; 428/425.9;
428/532; 428/694; 428/695; 428/900;
252/62.54
[58] Field of Search ............... 428/900, 694, 695, 328,
428/329, 413, 423, 425.9, 532, 403, 407;
252/62.54

[56] References Cited

U.S. PATENT DOCUMENTS

| 4,363,850 | 12/1982 | Yasui et al. ......................... 428/694 |
| 4,396,659 | 8/1983 | Shibuta et al. ....................... 428/694 |
| 4,397,751 | 8/1983 | Dickstein et al. .................... 428/900 |
| 4,405,684 | 9/1983 | Blumentritt et al. ............... 428/418 |
| 4,411,956 | 10/1983 | Matsufuji et al. ................... 428/900 |
| 4,415,630 | 11/1983 | Kubota et al. ....................... 428/900 |
| 4,444,850 | 4/1984 | Matsufuji et al. ................... 428/694 |
| 4,448,848 | 5/1984 | Okita et al. .......................... 428/900 |
| 4,454,202 | 6/1984 | Komine et al. ...................... 428/694 |

Primary Examiner—Ellis P. Robinson
Assistant Examiner—William M. Atkinson
Attorney, Agent, or Firm—Jordan B. Bierman

[57] ABSTRACT

A magnetic recording medium comprising a non-magnetic substrate, a magnetic layer comprising ferromagnetic particles, a binder group, and a titanate coupling agent, said binder group comprising at least one polyurethane resin and at least one of a nitrocellulose resin and an epoxy resin, said titanate coupling agent having 6 ligands wherein each ligand is free of ethylenically unsaturated double bonds.

22 Claims, No Drawings

MAGNETIC RECORDING MEDIUM

This application claims priority of Japanese Application No. 190273/1982, filed Oct. 29, 1982 and Japanese Application No. 195605/1982, filed Nov. 8, 1982.

BACKGROUND OF THE INVENTION

1. Field of the Invention

The present invention relates to an improved magnetic recording medium, more particularly, to a magnetic recording medium (e.g. magnetic tape and sheet) which has improved surface properties and wear resistance, as well as increased dispersibility of magnetic particles with the magnetic layer.

2. Description of the Prior Art

Conventional magnetic recording media such as audio tape and video tape are manufactured by applying a magnetic mix (paint) onto a non-magnetic film substrate such as polyethylene terephthalate, triacetyl cellulose, polycarbonate, polypropylene or polyvinyl chloride. The magnetic mix is a dispersion of magnetic particles in a binder selected from among vinyl chloride/vinyl acetate copolymers, vinyl chloride/vinylidene chloride copolymer, vinylidene chloride/acrylonitrile copolymers, butyl acrylate/acrylonitrile copolymers, cellulose resins, epoxy resins and polyurethane resins.

The conventional binders, whether they are used alone or in combination, have proved unsatisfactory in providing magnetic recording media with improved surface properties and wear resistance, as well as increased dispersibility of ferromagnetic particles. With video tape that is often required to record short-wavelength signals, an insufficient dispersion of magnetic particles in the magnetic layer reduces the S/N ratio and reproduction output power. Furthermore, the conventional magnetic recording m media keep running in intimate contact with the magnetic head in recording and reproducing modes, and as a result of repeated use, the magnetic layer wears to increase the chance of the dislodging of the magnetic particles. A plausible reason for this phenomenon is that the particles of a ferromagnetic material such as gamma-$Fe_2O_3$ have a hydrophilic surface which does not have high affinity for the binder, so they are not dispersed completely uniformly in the binder. Japanese Patent Application (OPI) No. 64330/82 (the symbol OPI as used herein means an unexamined published Japanese patent application) proposes increasing the affinity of the ferromagnetic powder for the binder by using a titanate coupling agent such as isopropyl tris(dioctylpyrophosphate)titanate, isopropyl tridecylbenzenesulfonyltitanate, bis(dioctylpyrophosphate)ethylene titanate, or di(dioctylpyrophosphate)oxyacetate titanate. However, the improvement achieved by this technique is not completely satisfactory. It is well known to use a vinyl chloride/vinyl acetate copolymer and a polyurethane resin as binders for video tape, mm and the technique of coating on a substrate with a magnetic mix having ferromagnetic particles dispersed in a mixture of these binders and the titanate coupling agent is shown in Japanese Patent Application (OPI) Nos. 111829/82, 64330/82 and 58135/81.

This combination of the binders and thitanate coupling agent has achieved some improvement, but it is not completely satisfactory.

Japanese Patent Application (OPI) No. 3227/82 shows the production of a stable magnetic layer by mixing a binder with tetra(2,2-diallyloxymethyl-1-butyl)bis(ditridecylphosphite)titanate ("KR-55", product by Kenrich Photochemicals, Inc.) which has 6 ligands, as well as an ethylenically double bond and allyl group, dispersing ferromagnetic particles in the mixture, coating the resulting magnetic mix onto a non-magnetic substrate, and exposing the web to the radiation. However, the magnetic layer formed by coating the magnetic mix in the presence of a coating solvent and drying the web with hot air cannot be stored for an extended period without causing deterioration.

It has been known that a greager wear resistance can be obtained by using nitrocellulose as a binder. However, one defect with the nitrocellulose is its poor adhesion to the non-magnetic substrate. In order to provide an improved adhesion, the use of a known dispersant such as lecithin or sulfate esters has been proposed, but with unsatisfactory results. Furthermore, nitrocellulose turns red when it is dissolved in a solvent together with a cationic dispersant.

SUMMARY OF THE INVENTION

The present invention has been accomplished in order to eliminate these problems with the conventional magnetic m recording medium, and one object of the invention is to provide a magnetic recording medium having high reproduction output power.

Another object of the present invention is to provide a magnetic recording medium having improved wear resistance.

Still another object of the present invention is to provide a magnetic recording medium having improved adhesion to a magnetic layer.

A further object of the present invention is to provide a magnetic recording medium having improved surface properties.

Still further object of the present invention is to provide a magnetic recording medium having improved keeping quality or shelf life.

These objects of the present invention can be achieved by a magnetic recording medium comprising a non-magnetic substrate coated with a magnetic layer comprising ferromagnetic particles, a binder group, and a titanate coupling agent, said binder group being selected from the following (a) and (B): (a) at least a nitrocellulose resin and a polyurethane resin, and (b) at least an epoxy resin and a polyurethane resin. Of said binder group (b), the preferred epoxy resin is a phenoxy resin.

The preferred titanate coupling agent is a 6-ligand compound. A b 6-ligand titanate coupling compound having the following formula is more preferred:

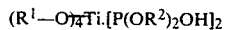

wherein $R^1$ is a straight or branched aliphatic hydrocarbon residue; $R^2$ is a straight or branched aliphatic hydrocarbon residue or aromatic hydrocarbon residue). In a particularly preferred embodiment, $R^1$ is aliphatic hydrocarbon residue having a total of 3 to 18 carbon atoms, and $R^2$ is an aliphatic hydrocarbon residue having a total of 6 to 20 carbon atoms.

DETAILED DESCRIPTION OF THE PREFERRED EMBODIMENTS

Illustrative titanate coupling agents that can be used in the magnetic recording medium of the present invention are listed in Table 1 below.

TABLE 1
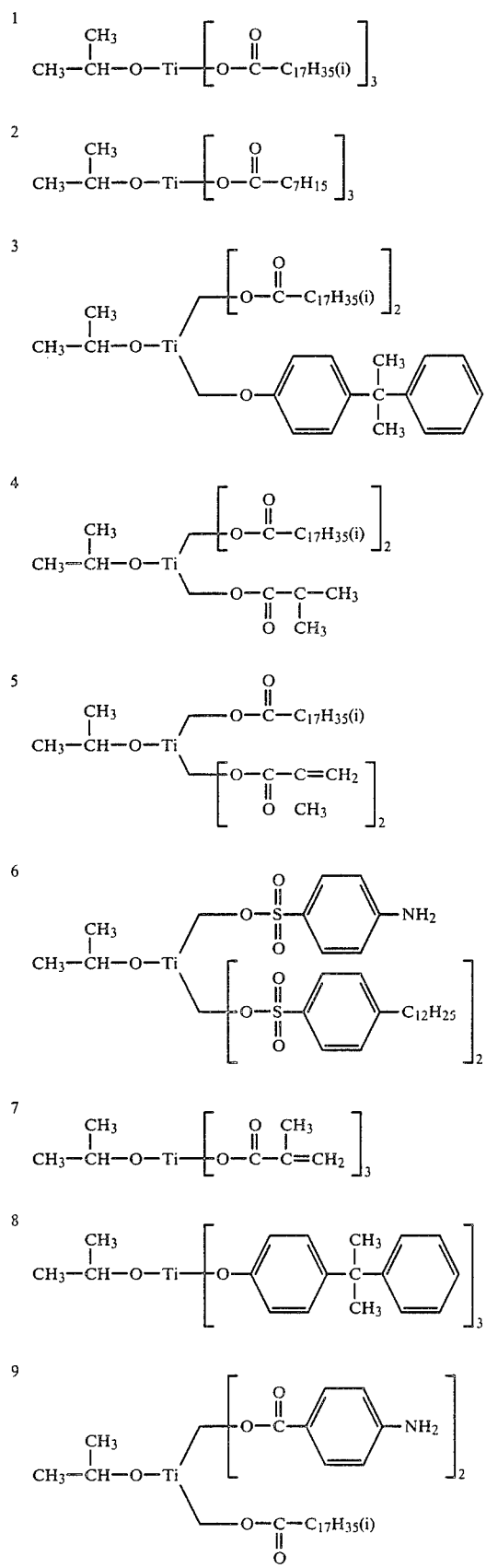
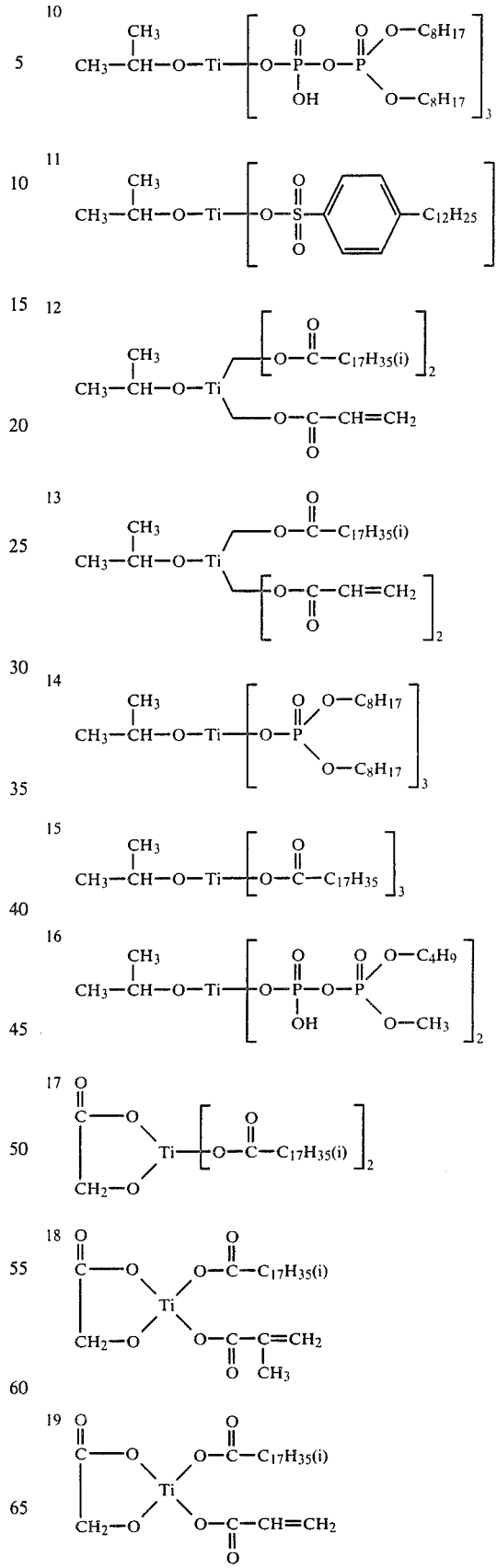

TABLE 1-continued
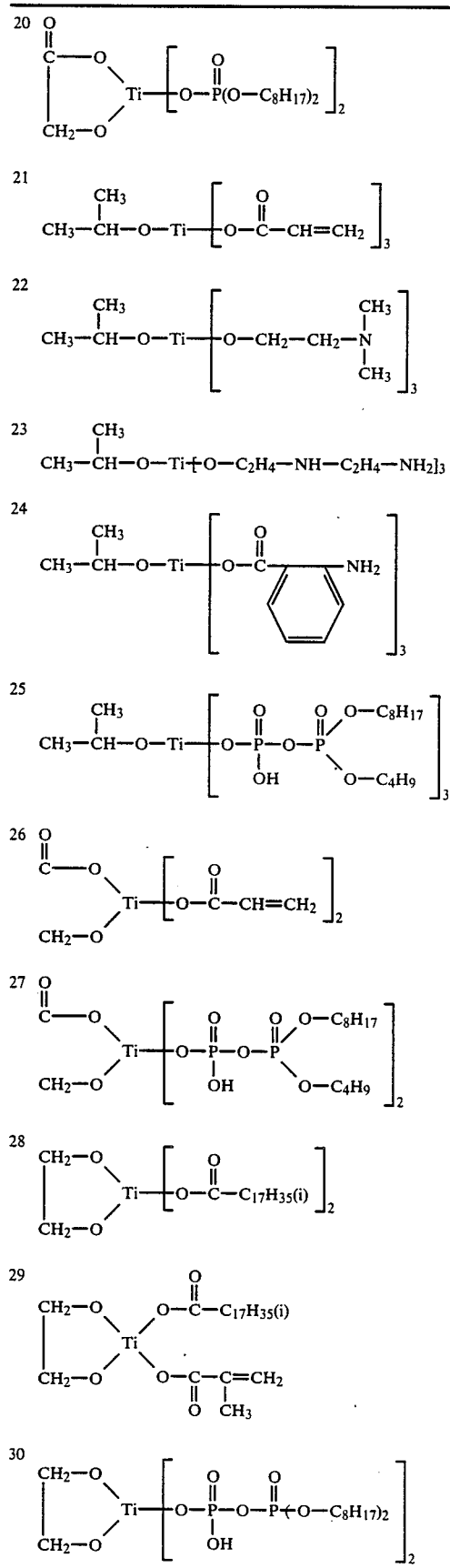
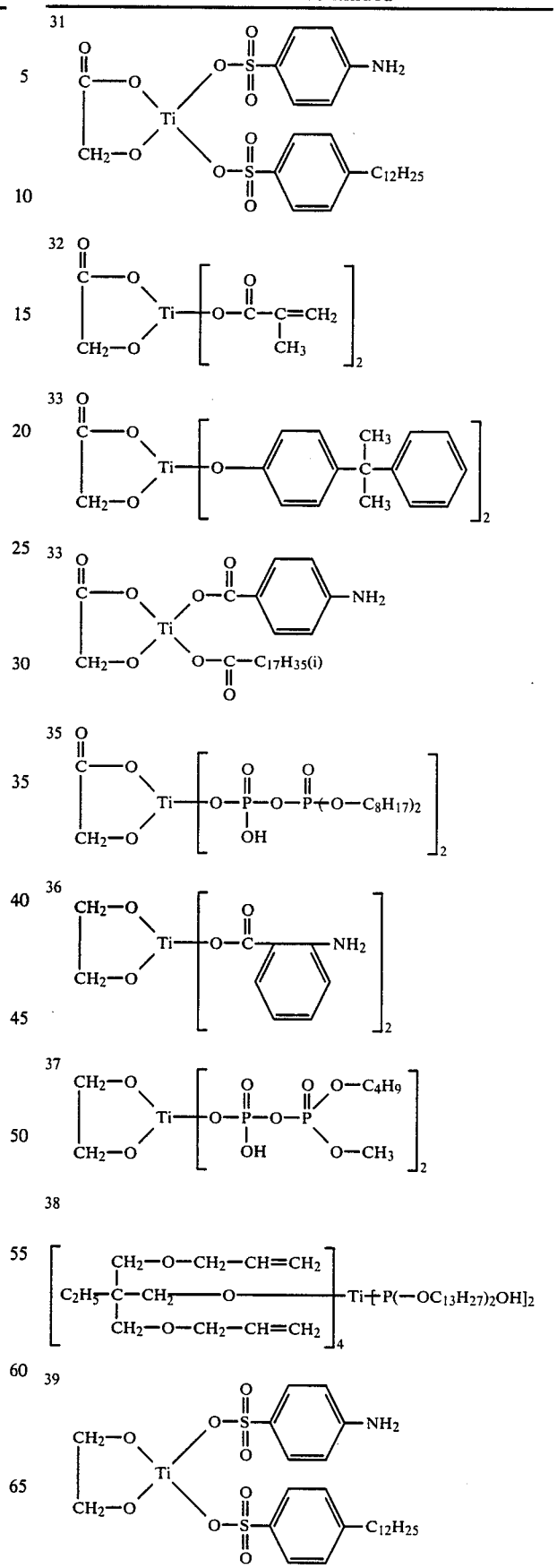

TABLE 1-continued

40

$$\begin{array}{c} CH_2-O \\ | \\ CH_2-O \end{array} Ti \left[ O-\overset{O}{\underset{\|}{C}}-C=CH_2 \atop CH_3 \right]_2$$

41

$$\begin{array}{c} CH_2-O \\ | \\ CH_2-O \end{array} Ti \begin{array}{c} O-\overset{O}{\underset{\|}{\underset{O}{S}}}-\!\!\!\!\!\!\!\!\!\bigcirc\!\!\!\!\!\!\!\!\!-NH_2 \\ O-\overset{O}{\underset{\|}{C}}-C_{17}H_{35}(i) \end{array}$$

42

$$\begin{array}{c} CH_2-O \\ | \\ CH_2-O \end{array} Ti \left[ O-\overset{O}{\underset{\|}{P}}-O-\overset{O}{\underset{\|}{P}}(-O-C_8H_{17})_2 \atop OH \right]_2$$

43

$$\begin{array}{c} CH_2-O \\ | \\ CH_2-O \end{array} Ti \left[ O-\overset{O}{\underset{\|}{C}}-CH=CH_2 \right]_2$$

Japanese Patent Application (OPI) Nos. 58138/81, 64330/82 and 58135/81, as well as Japanese Patent Publication No. 4803/80 disclose titanate coupling agents having a coordination number of four. However, for the purposes of the present invention, titanate coupling agents having a coordination number of six are preferred to those having a coordination number four. More preferred are those titanate coupling agents which have a coordination number six and the following formula:

$(R^1-O)_4Ti.[P(OR^2)_2OH]_2$ wherein $R^1$ is a straight or branched aliphatic hydrocarbon residue; $R^2$ is a straight or branched aliphatic or aromatic hydrocarbon residue). Illustrative compounds of this type are listed in Table 2 below.

TABLE 2

(1) Tetraisopropylbis(dioctylphosphite)titanate:

$$\left( \begin{array}{c} CH_3 \\ \phantom{C}\diagdown \\ CH_3 \diagup \end{array} CH-O \right)_4 Ti.[P(-OC_8H_{17})_2OH]_2$$

(2) Tetraoctylbis(ditridecylphosphite)titanate:
$(C_8H_{17})_4Ti.[P(-OC_{13}H_{27})_2OH]_2$ (3) Tetraundecylbis(diphenetylphosphite)titanate:

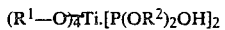
$(C_{11}H_{23}-O)_4Ti.[P(-OCH_2CH_2-\!\!\!\bigcirc\!\!\!)_2OH]_2$ (4) Tetraisopropylbis(dihexylphosphite)titanate:

$$\left( \begin{array}{c} CH_3 \\ \phantom{C}\diagdown \\ CH_3 \diagup \end{array} CH-O \right)_4 Ti.[P(-OC_6H_{13})_2OH]_2$$

TABLE 2-continued (5) Tetraheptylbis(ditridecylphosphite)titanate:
$(C_7H_{15}-O)_4Ti.[P(-OC_{13}H_{27})_2OH]_2$ (6) Tetranonylbis(ditetradecylphosphite)titanate:
$(C_9H_{19}-O)_4Ti.[P(-OC_{14}H_{29})_2OH]_2$ (7) Tetraheptylbis(dibenzylphosphite)titanate:

$(C_7H_{15}-O)_4Ti.[P(-O-CH_2-\!\!\!\bigcirc\!\!\!)_2OH]_2$ (8) Tetraheptylbis(di-p-tolylmethylphosphite)titanate:

$(C_7H_{15}-O)_4Ti.[P(-O-CH_2-\!\!\!\bigcirc\!\!\!-CH_3)_2OH]_2$ (9) Tetrapentylbis(ditetradecylphosphite)titanate:
$(C_5H_{11}-O)_4Ti.[P(-OC_{14}H_{29})_2OH]_2$

(10) Tetraundecylbis(dinonylphosphite)titanate:
$(C_{11}H_{23}-O)_4Ti.[P(-OC_9H_{19})_2OH]_2$

(11) Tetraisopropylbis(diundecylphosphite)titanate:

$$\left( \begin{array}{c} CH_3 \\ \phantom{C}\diagdown \\ CH_3 \diagup \end{array} CH-O \right)_4 Ti.[P(-O-C_{11}H_{23})_2OH]_2$$

(12) Tetraisopropylbis(dibenzylphosphite)titanate:

$$\left( \begin{array}{c} CH_3 \\ \phantom{C}\diagdown \\ CH_3 \diagup \end{array} CH-O \right)_4 Ti.[P(-O-CH_2-\!\!\!\bigcirc\!\!\!)_2OH]_2$$

(13) Tetraisopropylbis(ditridecylphosphite)titanate:

$$\left( \begin{array}{c} CH_3 \\ \phantom{C}\diagdown \\ CH_3 \diagup \end{array} CH-O \right)_4 Ti.[P(-O-C_{13}H_{27})_2OH]_2$$

(14) Tetraundecylbis(dinaphthylmethylphosphite)titanate:

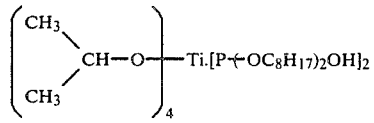
$(C_{11}H_{23}-O)_4Ti.[p(-O-CH_2-naphthyl)_2OH]_2$

(15) Tetra(2,2-dipropyloxymethyl-1-butyl)bis(ditridecylphosphite)-titanate:

$$\left( \begin{array}{c} CH_2-O-C_3H_7 \\ | \\ C_2H_5-C-CH_2-O \\ | \\ CH_2-O-C_3H_7 \end{array} \right)_4 Ti.[P(-OC_{13}H_{27})_2OH]_2$$

(16) Tetraoctylbis(di-p-dodecylphenylphosphite)titanate:

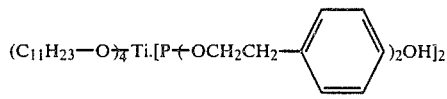
$(C_8H_{17}O)_4Ti.[P(-O-\!\!\!\bigcirc\!\!\!-C_{12}H_{25})_2OH]_2$

(17) Tetraisopropylbis(di-m-tolylethylphosphite)titanate:

TABLE 2-continued

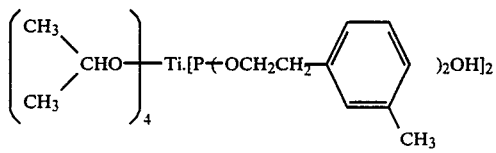

(18) Tetra(2-propyloxymethyl-1-butyl)bis(octylphosphite)titanate:

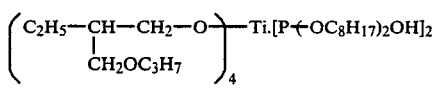

(19) Tetraisopropylbis(di-p-dodecylphenylphosphite)titanate:

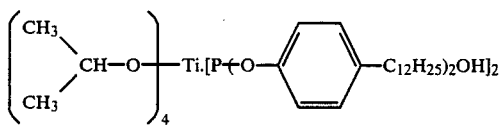

Titanate coupling agents having an allyl group as those for instance represented by the following formula:

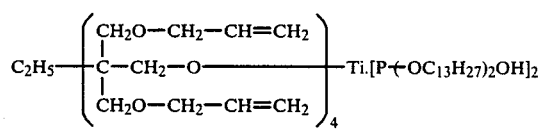

remain effective in providing improved wear resistance for a certain period after the application of a magnetic mix. However, their effect is not achieved unless a careful control is made over the length of the application period. Nevertheless, these compounds may be used in the present invention because the binder itself does not have a double bond. Considered with the keeping quality or shelf life, it is preferable that the titanate coupling agent having 6 ligands don't contain an ethylenically double bond.

In the titanate coupling agents illustrated above, the group $R^1$ is primarily responsible for the lipophilicity (hydrophobicity) of the agents and improves their affinity for the binder, and the group $OR^2$ is capable of being hydrolyzed to facilitate the attachment of the agents onto the surface of ferromagnetic particles. For providing these properties, $R^1$ must have a molecular chain of a suitable length and the preferred number of carbon atoms ranges from 3 to 18. A branched chain is preferred for providing increased affinity for the binder. The preferred number of carbon atoms in $R^2$ ranges from 6 to 20. If $R^2$ contains an aromatic hydrocarbon group or otherwise provides a three-dimensional bulkiness, the residual (i.e. left unbound to the magnetic particles) still exhibits lipophilicity. A saturated aliphatic hydrocarbon group or alkyl group is preferred as $R^1$ and $R^2$ because the resulting magnetic layer experiences less time-dependent changes and can be stored for an extended period (long shelf life). In addition to a typical alkyl group (which may be an aromatic hydrocarbon group for $R^2$), an alkyl group containing a hetero atom (e.g. oxygen and nitrogen) and a substituted alkyl group are also preferred as $R^1$ and $R^2$.

The following polyurethane resins may be used as a component of the binder incorporated in the magnetic recording medium of the present invention: Acrethane (acrylic urethane of Fujikura Kasei Co., Ltd.), Sofrannate (MS-23 (product of the Tokyo Rubber Industry Co., Ltd.), PS-706 (hard type urethane resin of Mitsui-Nisso Urethane Co., Ltd.), PS-815 (hard type urethane resin of Mitsui-Nisso Urethane Co., Ltd.), MAU-2010 (product of Dainichi Seika Color & Chemicals Mfg. Co., Ltd.), N-3022 (product of Nippon Polyurethane Industry Co., Ltd.), DN-3985 (product of Nippon Polyurethane Industry Co., Ltd.), Estan 5701 (product of B.F. Good Rich Chemicals Co.), and PANDEX 78-8 (product of Dainippon Ink and Chemicals, Inc.). Among these products, Sofrannate MS-23, PS-706, MAU-2010, N-3022, DN-3985 and Estan 5701 are preferred. These preferred resins have a weight average molecular weight in the range of from 1,000 to 230,000. Particularly preferred are polyurethane resins of hard type (with high tensile strength) having a weight average molecular weight of 100,000 to 180,000, which are used in combination with those of soft type (with high elongation at break) having a weight average molecular weight of 30,000 to 90,000. The definition of the "tensile strength" and "elongation at break" and the methods for testing these parameters are specified in JIS KS 301-1975.

Suitable examples of the nitrocellulose, one of resins other than the polyurethane resin of the binder in the magnetic recording medium of the present invention, include "Celnova BTH ½" and "Nitrocellulose SL-1" of Asahi Chemical Industry Co., Ltd., as well as "Nitrocellulose RS ½" and "Celline L-200" of Daicel Chemical Industries, Ltd. The preferred nitrocellulose has a viscosity {as defined in JIS K-6703 (1975)} of 2 to 1/64 second, and those having a viscosity in the range of 1 to ¼ second are particularly preferred for incorporation in magnetic recording media because they provide a stable magnetic layer that adheres firmly to the non-magnetic substrate.

Suitable epoxy resins that may be used as one of resins other than the polyurethane resin of the binder are listed below: Araldite 6084 (bisphenol A type of Ciba-Geigy Corporation with an average molecular weight of 1740–2050), Araldite 6099 (bisphenol A type of Ciba-Geigy Corporation with an average molecular weight of 4800–8000), ECN-1273 (novolak type of Ciba-Geigy Corporation, with an average molecular weight of 1080), Epikote 834 (bisphenol A type of Shell Chemical Co., Ltd., with an average molecular weight of 470), Epikote 1004 (bisphenol A type of Shell Chemical Co., with an average molecular weight of 1600), Epikote 1007 (bisphenol A type of Shell Chemical Co., with an average molecular weight of 2900), EP-4080 (hydrogenated bisphenol A type of Asahi Denki Kasei K.K.) and EPV-6 (urethane-modified type of Asahi Denki Kasei K.K.). Among these epoxy resins, Araldite 6084, Araldite 6099, Epikote 1004 and Epikote 1007 are preferred because of their high keeping quality and wear resistance.

A phenoxy resin is preferred as the epoxy resin. The various phenoxy resins can be used as one of resins other than the polyurethane resin of the binder in the magnetic recording medium of the present invention, the following are preferred for the purpose of providing improved keeping quality and wear resistance: STX-04 (hydrogenated type of Toto Kasei K.K.), STX-05 (covalent bond type of Toto Kasei, K.K.), and PKHH (product of Union Carbide Corporation).

The above listed phenoxy resins may be used either individually or in combination, and so are the epoxy resins. Phenoxy resins have more heat-resistance than other resins and hence are preferred as the binder component.

Examples of the particulate ferromagnetic material include oxides such as gamma-$Fe_2O_3$, $Fe_3O_4$, iron oxides of non-stoichiometric oxidation compound between gamma-$Fe_2O_3$ and $Fe_3O_4$, Co-coated gamma-$Fe_2O_3$, Co-doped gamma-$Fe_2O_3$, Co-coated $Fe_3O_4$, Co-doped $Fe_3O_4$ and $CrO_2$, as well as metallic particles (metals and alloys) such as Fe, Co, Fe-Co-Ni, Fe-Ni-Zn, Fe-Ni, Mn-Bi, Fe-Co-Ni-Cr, Fe-Co-Ni-P and Ni-Co. As the oxides, iron oxides are preferable, and, as the iron oxides, Co-containing (coated or doped) iron oxides are preferable. As the metallic particles, those which have iron as the main component are preferable, and, as the metallic particles which have iron as the main component, those of which the iron content is 50 wt% or more, preferably 60 wt% or more, are preferable.

If the phenoxy resin is included in the binder, metallic particles are particularly preferred. It is generally understood that the metallic particles may produce hydrogen chloride by decomposing a halogen-containing binder such as vinyl chloride-vinyl acetate copolymer. However, the phenoxy resin is very stable against the metallic particles. At the same time, the phenoxy resin is highly effective in increasing the dispersibility of the metallic particles when it is used in combination with the titanate coupling agent as defined in the present invention.

The above illustrated ferromagnetic particles are dispersed in a coating solvent together with the binder and the titanate coupling agent in order to prepare a magnetic mix. For achieving greater dispersibility of the magnetic particles, they are preferably pretreated with the titanate coupling agent, and in this case, an additional supply of the titanate coupling agent may or may not be incorporated in the solvent. The so prepared magnetic mix is applied to a non-magnetic substrate to produce the magnetic recording medium of the present invention. More specifically, the titanate coupling agent is dissolved in a solvent such as toluene or methyl ethyl ketone together with a predetermined amount of the ferromagnetic particles. After through agitation, the mixture is filtered and optionally dried to obtain surface-treated ferromagnetic particles, which are subsequently dispersed in a suitable dispersion medium together with the binder. Alternatively, the binder and the titanate coupling agent are added into a dispersion medium together with untreated ferromagnetic particles either directly or in the form of a solution in a suitable solvent such as toluene or methyl ethy ketone.

The titanate coupling agent is generally used in an amount of 0.5 to 15 parts by weight, preferably from 0.5 to 8 parts by weight, per 100 parts by weight of the ferromagnetic particles. If less than 0.5 part by weight of the coupling agent is used, it sometimes occurs that the ferromagnetic particles are not uniformly dispersed in the binder. If the amount of the coupling agent exceeds 15 parts by weight, the resulting magnetic layer may become sticky.

The pretreatment of the ferromagnetic particles with the titanium coupling agent is preferred because by so doing, the dipersibility of the ferromagnetic particles may be improved.

If both nitrocellulose and the polyurethane resin are used as binders, their total amount generally ranges from 10 to 40 parts by weight, preferably 10 to 25 parts by weight, per 100 parts by weight of the ferromagnetic particles. These resins are not effective as binders if they are used in an amount of less than 10 parts by weight per 100 parts by weight of the ferromagnetic particles. The nitrocellulose and polyurethane resin may of course be used in combination with other binders.

If the epoxy resin, preferably the phenoxy resin is used in combination with the polyurethane resin, their total amount generally ranges from 5 to 70 parts by weight, preferably 10 to 60 parts by weight, per 100 parts by weight of the ferromagnetic particles. These ranges are selected in order to maximize the effects of these binders and to ensure magnetic recording at high density.

Besides the ferromagnetic particles, the titanate coupling agent and the binder described above, the magnetic layer may contain other additives such as dispersants, lubricants, abrasives and antistats.

Examples of the dispersant are aliphatic acids having 8 to 18 carbon atoms (RCOOH wherein R is a saturated or unsaturated alkyl group having 7 to 17 carbon atoms) such as caprylic acid, capric acid, lauric acid, myristic acid, palmitic acid, stearic acid, oleic acid, elaidic acid, linoleic acid, linolenic acid, and stearolic acid. Metal soaps made of alkali metals (Li, Na, K, etc.) or alkaline earth metals (Mg, Ca, Ba, etc.) of these aliphatic acids, as well as lecithins may also be used as the dispersant. Higher alcohols having 12 or more carbon atoms, as well as sulfate esters of these alcohols are also usable. Also usable are commercial surfactants. These dispersants and those listed above may be used either individually or in admixture in an amount of 1 to 20 parts by weight for 100 parts by weight of the ferromagnetic particles.

Examples of the lubricant are silicone oil, carbon black, graphite, carbon black graft polymers, molybdenum disulfide, tungsten disulfide, aliphatic acid esters (i.e. waxes) of monobasic aliphatic acids having 12 to 16 carbon atoms and monovalent alcohols having carbon atoms whose number as added to the number of carbon atoms in the aliphatic acids is 21 to 23. These lubricants are used in an amount of 0.2 to 20 parts by weight for 100 parts by weight of the ferromagnetic particles.

Common abrasives may be used in the present invention, and they include fused alumina, silicon carbide, chromium oxide, corundum, artificial corundum, diamond, artificial diamond, garnet, and emery (main components: corundum and magnetite). These abrasives have an average particle size of 0.05 to 5$\mu$, and a 0.1 to 2$\mu$ range is particularly preferred. They are used in an amount of 1 to 20 parts by weight per 100 parts by weight of the ferromagnetic particles.

Suitable antistats are fine particles of an electrically conductive material such as graphite, carbon black, or carbon black graft polymer; a natural surfactant such as saponin; an alkylene oxide, glycerin or glycidol nonionic surfactant; a cationic surfactant such as higher alkylamines, quaternary ammonium salts, heterocyclic compounds (e.g. pyridine), and phosphonium or sulfonium; an anionic surfactant containing an acidic group such as carboxylic acid group, sulfonic acid group, phosphoric acid group, sulfate ester group or phosphate ester group; and an amphoteric surfactant such as amino acids, aminosulfonic acids, and sulfate or phosphate esters of aminoalcohol. Various solvents may be used for preparing a magnetic mix or as an aid to the application of the magnetic mix. Suitable solvents include ketones such as acetone, methyl ethyl ketone, methyl isobutyl ketone and cyclohexanone; alcohols such as methanol, ethanol, propanol and butanol; esters such as methyl acetate, ethyl acetate, butyl acetate, ethyl lactate, and glycol acetate monoethyl ether; glycol ethers such as glycol dimethyl ether, glycol monoethyl ether and dioxane; aromatic hydrocarbons such as benzene, toluene and xylene; chlorinated hydrocarbons such as methylene chloride, ethylene chloride, carbon tetrachloride, chloroform, and dichlorobenzene.

Suitable non-magnetic substrates include polyesters such as polyethylene terephthalate and polyethylene-2,6-naphthalate; polyolefins such as polypropylene; cellulose derivatives such as cellulose triacetate and diacetate; plastics such as polycarbonate; non-magnetic metals such as aluminum, copper, and zinc; and ceramics such as glass, porcelain and earthenware.

The thickness of these non-magnetic substrates varies with their physical shape. For films and sheets, the thickness is between about 3 and 100 μm, preferably from 5 to 50 μm; for disks and cards, the thickness ranges from about 30 μm to 10 mm. The substrates may be in a cylindrical drum shape whose specific configuration is determined by the type of the recorder with which the magnetic recording medium of the present invention is used.

The ferromagnetic particles, as well as the titanate coupling agent, the binder components, dispersant, lubricant, abrasive, antistat and solvent are mixed to form a magnetic mix. The magnetic mix is prepared by charging a mixer with the ferromagnetic particles and all other necessary ingredients simultaneously or sequentially. For example, the ferromagnetic particles are added to a solution containing the titanate coupling agent, and the mixture is stirred for a predetermined period, and then, the other ingredients are added under stirring.

. Various mixers may be used to achieve thorough mixing of the magnetic mix composition. Examples are a two-roll mill, three-roll mill, ball mill, pebble-mill, sand grinder, Szegvari attritor, high-speed-impeller disperser, high-speed-stone-mill, high-speed impact mill, disperse-kneader, high-speed mixer, homogenizer and ultrasonic disperser.

The magnetic mix prepared according to this method is characterized by a highly uniform dispersion of the ferromagnetic particles, and when their dispersibility was evaluated by the method described in the Examples that are given later in this specification, much fewer agglomerates were observed under electron microscope than in the case of the conventional magnetic mix.

For details of the kneading and dispersing technique, see T. C. Patton, "Paint Flow and Pigment Dispersion", John Wiley & Sons, as well as U.S. Pat. Nos. 2,581,414 and 2,855,156.

A magnetic coating is formed from the magnetic mix on the non-magnetic substrate by air doctor coating, blade coating, air knife coating, squeeze coating, reverse roll coating, transfer roll coating, gravure coating, kiss coating, cast coating, spray coating, and spin coating. For details of these and other coating techniques, see "Coating Kogaku (Coating Engineering)", published by Asakura Shoten, Mar. 20, 1971.

The magnetic coating thus formed on the substrate is dried after the ferromagnetic particles in the coating are optionally oriented in a magnetic field. If necessary, the web with the magnetic coat may have its surface smoothened or may be slit into a shape desired for the final magnetic recording medium. For the magnetic orientation, an a.c. or d.c. may be employed. The web is subsequently dried. The drying temperature and period may vary according to the specific case.

The magnetic recording medium thus prepared according to the present invention has the following advantages: (1) high reproduction output, (2) the magnetic layer with improved wear resistance, (3) improved adhesion between the magnetic layer and the substrate, (4) excellent surface properties, and (5) improved keeping quality or shelf life.

The advantages of the present invention are hereunder described in greater detail by reference to working examples and comparative examples, wherein all parts are by weight.

EXAMPLE 1

Ferromagnetic particles of Co-coated gamma-$Fe_2O_3$ were thoroughly mixed in a ball mill with the following components in the amounts indicated below.

| | |
|---|---|
| Co—coated gamma-$Fe_2O_3$ particles | 75 parts |
| Nitrocellulose RS ½ (product of Daicel Chemical Industries, Ltd.) | 5 parts |
| Estan 5701 (product of B. F. Goodrich Chemical Co.) | 9 parts |
| Methyl ethyl ketone | 70 parts |
| Toluene | 60 parts |
| Cyclohexanone | 5 parts |
| Tetra(2,2-diallyloxymethyl-1-butyl)bis-(ditridecylphosphite)titanate | 1.5 parts |

To the resulting mixture, 5 parts of Collonate L(polyisocyanate of Nippon Polyurethane Industry Co., Ltd.) was added, and the mixture was further stirred to provide a magnetic mix. The mix was applied uniformly to one side of a polyethylene terephthalate film (12 μm thick) to give a dry coating thickness of 5 μm while the web was placed in a magnetic field of 2,000 gauss. The web was then dried and super-calendered. The so treated web was slit to 12.65 mm wide and shaped into video tape sample No. S-1.

EXAMPLE 2

Ferromagnetic particles of Co-coated gamma-$Fe_2O_3$ were thoroughly mixed in a ball mill with the following components in the amounts indicated below.

| | |
|---|---|
| Co—coated gamma-$Fe_2O_3$ paticles | 75 parts |
| Nitrocellulose RS ½ | 5 parts |
| Estan 5701 | 9 parts |
| Methyl ethyl ketone | 70 parts |
| Toluene | 60 parts |
| Cyclohexanone | 5 parts |
| Tetra(isopropoxy)bis(dioctadecylphosphite)-titanate | 1.5 parts |

To the resulting mixture, 5 parts of Collonate L was added, and the mixture was further stirred to provide a magnetic mix. The mix was applied uniformly to one side of a polyethylene terephthalate film as in Example 1 so as to give a dry thickness of 5 μm. The web was then dried and supercalendered. The so treated web was slit to 12.65 mm wide and shaped into video tape sample No. S-2.

EXAMPLE 3

Ferromagnetic particles of Co-coated gamma-$Fe_2O_3$ were thoroughly mixed in a ball mill with the following components in the amounts indicated below.

| | |
|---|---|
| Co—coated gamma-$Fe_2O_3$ particles | 75 parts |
| Nitrocellulose RS ½ | 5 parts |
| Estan 5701 | 9 parts |
| Methyl ethyl ketone | 70 parts |
| Toluene | 60 parts |
| Cyclohexanone | 5 parts |
| Tetra(2,2-dipropyloxymethyl-1-butyl)-bis(ditridecylphosphite)titanate | 1.5 parts |

To the resulting mixture, 5 parts of Collonate L was added, and the mixture was further stirred to provide a magnetic mix. The mix was applied uniformly to one side of a polyethylene terephthalte film as in Example 1 so as to give a dry thickness of 5 μm. The web was then dried and supercalendered. The so treated web was slit to 12.65 mm wide and shaped into video tape sample No. S-3.

EXAMPLE 4

One part of tetraundecylbis(diphenetylphosphite)titanate was dissolved in 500 cc of toluene. In the resulting solution, ferromagnetic particles of Co-coated gamma-$Fe_2O_3$ (100 parts) were dispersed. The dispersion was filtered, dried first with air, then under vacuum at 80° C. so as to prepare surface-treated ferromagnetic particles. These ferromagnetic particles were mixed thoroughly in a ball mill with the following components in the amounts indicated below.

| | |
|---|---|
| Surface-treated Co—coated gamma-$Fe_2O_3$ particles | 75 parts |
| Nitrocellulose RS ½ | 5 parts |
| Estan 5701 | 9 parts |
| Methyl ethyl ketone | 70 parts |
| Toluene | 60 parts |
| Cyclohexanone | 5 parts |

To the resulting mixture, 5 parts of Collonate L was added, and the mixture was further stirred to provide a magnetic mix. The mix was applied uniformly to one side of a polyethylene terephthalate film (12 μm thick) to give a dry coating thickness of 5 μm while the web was placed in a magnetic field to orient the ferromagnetic particles. The web was then dried and supercalendered. The so treated web was slit to 12.65 mm wide and shaped into video tape sample No. S-4.

EXAMPLE 5

As in Example 4, one part of tetraocytylbis(ditridecylphosphite)titanate was dissolved in 500 cc of toluene, and 100 parts of ferromagnetic Co-coated gamma-$Fe_2O_3$ particles were dispersed in the resulting solution. The dispersion was filtered, dried first with air, then under vacuum at 80° C. so as to prepare surface-treated ferromagnetic particles. These ferromagnetic particles were mixed thoroughly in a ball mill with the following components in the amounts indicated below.

| | |
|---|---|
| Surface-treated Co—coated gamma-$Fe_2O_3$ particles | 75 parts |
| Nitrocellulose RS ½ | 5 parts |
| Estan 5701 | 9 parts |
| Methyl ethyl ketone | 70 parts |
| Toluene | 60 parts |
| Cyclohexanone | 5 parts |

To the resulting mixture, 5 parts of Collonate L was added, and the mixture was further stirred to provide a magnetic mix. The mix was applied to one side of a polyethylene terephthalate film (12 μm thick) to give a dry coating thickness of 5 μm while the web was placed in a magnetic field to orient the ferromagnetic particles. The web was then dried and supercalendered. The so treated web was slit to 12.65 mm wide and shaped into video tape sample No. S-5.

EXAMPLES 6 TO 8

Ferromagnetic particles of Fe-Co-Ni alloy were thoroughly mixed in a ball mill with the following components in the amounts indicated below.

| | |
|---|---|
| Fe—Co—Ni particles | 75 parts |
| Nitrocellulose RS ½ | 5 parts |
| Estan 5701 | 9 parts |
| Methyl ethyl ketone | 70 parts |
| toluene | 60 parts |
| Cyclohexanone | 5 parts |
| Tetra(2,2-diallyloxymethyl-1-butyl)bis-(ditridecylphosphite)titanate | 1.5 parts |

To the resulting mixture, 5 parts of Collonate L was added, and the mixture was further stirred to provide a magnetic mix. The mix was applied uniformly to one side of a polyethylene terephthalate film as in Example 1 so as to give a dry thickness of 5 μm. The web was then dried and supercalendered. The so treated web was slit to 12.65 mm wide and shaped into video tape sample No. S-6 (Example 6). Video tape samples No. S-7 and No. S-8 (Examples 7 and 8) were prepared by repeating the same procedure except that tetra(2,2-diallyloxymethyl-1-butyl)bis(ditridecylphosphite)titanate was replaced by tetra(isopropoxy)bis(dioctadecylphosphite)titanate and tetra(2,2-dipropyloxymethyl-1-butyl)bis(ditridecylphosphite)titanate, respectively.

EXAMPLE 9

One part of tetraundecylbis(diphenetylphosphite)titanate was dissolved in 500 cc of toluene, and 100 parts of ferromagnetic Fe-Co-Ni particles were dispersed in the resulting solution. The dispersion was filtered, dried first with air, then under vacuum at 80° C. so as to prepare surface-treated ferromagnetic particles. These ferromagnetic particles were mixed thoroughly in a ball mill with the following components in the amounts indicated below.

| | |
|---|---|
| Surface-treated Fe—Co—Ni particles | 75 parts |
| Nitrocellulose RS ½ | 5 parts |
| Estan 5701 | 9 parts |
| Methyl ethyl ketone | 70 parts |
| Toluene | 60 parts |
| Cyclohexanone | 5 parts |

To the resulting mixture, 5 parts of Collonate L was added, and the mixture was further stirred to provide a magnetic mix. The mix was applied uniformly to one side of a polyethylene terephthalate film (12 μm thick) to give a dry coating thickness of 5 μm while the web was placed in a magnetic field to orient the ferromagnetic particles. The web was then dried and supercalendered. The so treated web was slit to 12.65 mm wide and shaped into video tape sample No. S-9.

EXAMPLE 10

One part of tetraoctylbis(ditridecylphosphite)titanate was dissolved in 500 cc of toluene, and 100 parts of ferromagnetic Fe-Co-Ni particles were dispersed in the resulting solution. The dispersion was filtered, dried first with air, then under vacuum at 80° C. so as to prepare surface-treated ferromagnetic particles. These ferromagnetic particles were mixed thoroughly in a ball mill with the following components in the amounts indicated below.

| | |
|---|---|
| Surface-treated Fe—Co—Ni particles | 75 parts |
| Nitrocellulose RS ½ | 5 parts |
| Estan 5701 | 9 parts |
| Methyl ethyl ketone | 70 parts |
| Toluene | 60 parts |
| Cyclohexanone | 5 parts |

To the resulting mixture, 5 parts of Collonate L was added, and the mixture was further stirred to provide a magnetic mix. The mix was applied to one side of a polyethylene terephthalate film (12 μm thick) to give a dry coating thickness of 5 μm while the web was placed in a magnetic field to orient the ferromagnetic particles. The web was then dried and supercalendered. The so treated web was slit to 12.65 mm wide and shaped into video tape sample No. S-10.

COMPARATIVE EXAMPLE 1

Ferromagnetic particles of Co-coated gamma-$Fe_2O_3$ were thoroughly mixed in a ball mill with the following components in the amounts indicated below.

| | |
|---|---|
| Co—coated gamma-$Fe_2O_3$ particles | 75 parts |
| Nitrocellulose RS ½ | 5 parts |
| Estan 5701 | 9 parts |
| Methyl ethyl ketone | 70 parts |
| Toluene | 60 parts |
| Cyclohexanone | 5 parts |
| Lecithin | 0.5 parts |

To the resulting mixture, 5 parts of Collonate L was added, and the mixture was further stirred to provide a magnetic mix. The mix was applied to one side of a polyethylene terephthalate film (12 m thick) to give a dry coating thickness of 5 m while the web was placed in a magnetic field of 2,000 gauss. The web was then dried and supercalendered. The so treated web was slit to 12.65 mm wide and shaped into video tape sample No. R-1.

COMPARATIVE EXAMPLE 2

Ferromagnetic particles of Co-coated gamma-$Fe_2O_3$ were thoroughly mixed in a ball mill with the following components in the amounts indicated below.

| | |
|---|---|
| Co—coated gamma-$Fe_2O_3$ particles | 75 parts |
| Nitrocellulose RS ½ | 5 parts |
| Estan 5701 | 9 parts |
| Methyl ethyl ketone | 70 parts |
| Toluene | 60 parts |
| Cyclohexanone | 5 parts |

-continued

| | |
|---|---|
| Di(hydroxylethyloxyethyl)stearylamine $C_{17}H_{35}-N[(CH_2CH_2O)_2H]_2$ | 1.5 parts |

To the resulting mixture, 5 parts of Collonate L was added, and the mixture was further stirred to provide a magnetic mix. The mix was applied uniformly to one side of a polyethylene terephthalate base as in Comparative Example 1 so as to give a dry thickness of 5 μm. The web was dried and supercalendered. The so treated web was slit to 12.65 mm wide and shaped into video tape sample No. R-2.

COMPARATIVE EXAMPLE 3

Ferromagnetic Fe-Co-Ni particles were thoroughly mixed in a ball mill with the following components in the amounts indicated below.

| | |
|---|---|
| Fe—Co—Ni particles | 75 parts |
| Nitrocellulose RS ½ | 5 parts |
| Estan 5701 | 9 parts |
| Methyl ethyl ketone | 70 parts |
| Toluene | 60 parts |
| Cyclohexanone | 5 parts |
| Lecithin | 0.5 part |

To the resulting mixture, 5 parts of Collonate L was added, and the mixture was further stirred to provide a magnetic mix. The mix was applied to one side of a polyethylene terephthalate film (12 μm thick) to give a dry coating thickness of 5 μm while the web was placed in a magnetic field of 2,000 gauss. The web was then dried and supercalendered. The so treated web was slit to 12.65 mm wide and shaped into video tape sample No. R-3.

COMPARATIVE EXAMPLE 4

Ferromagnetic Fe-Ni alloy particles were thoroughly mixed in a ball mill with the following components in the amounts indicated below.

| | |
|---|---|
| Fe—Ni particles | 75 parts |
| Nitrocellulose RS ½ | 5 parts |
| Estan 5701 | 9 parts |
| Methyl ethyl ketone | 70 parts |
| Toluene | 60 parts |
| Cyclohexanone | 5 parts |
| Di(hydroxyethyloxyethyl)stearylamine | 1.5 parts |

To the resulting mixture, 5 parts of Collonate L was added, and the mixture was further stirred to provide a magnetic mix. The mix experienced a significant change in color and turned red. It was applied to one side of a polyethylene terephthalate film as in Comparative Example 3 to give a dry coating thickness of 5 μm. The web was then dried and supercalendered. The so treated web was slit to 12.65 mm wide and shaped into video tape sample No. R-4.

COMPARATIVE EXAMPLE 5

Ferromagnetic Fe-Co-Ni particles were thoroughly mixed in a ball mill with the following components in the amounts indicated below.

| | |
|---|---|
| Fe—Co—Ni particles | 75 parts |
| Vinyl chloride/vinyl acetate copolymer ("VAGH" of Union Carbide Corporation) | 5 parts |

| Estan 5701 | 9 parts |
| Methyl ethyl ketone | 70 parts |
| Toluene | 60 parts |
| Cyclohexanone | 5 parts |

To the resulting mixture, 5 parts of Collonate L was added, and the mixture was further stirred to provide a magnetic mix. The mix was applied to one side of a polyethylene terephthalate film (12 μm thick) to give a dry coating thickness of 5 μm while the web was placed in a magnetic field of 2,000 gauss. The web was then dried and supercalendered. The so treated web was slit to to 12.65 mm wide and shaped into video tape sample No. R-5.

COMPARATIVE EXAMPLE 6

Ferromagnetic particles of Fe-Co-Ni alloy were thoroughly mixed in a ball mill with the following components in the amounts indicated below.

| Fe—Co—Ni particles | 75 parts |
| "VAGH" | 5 parts |
| Estan 5701 | 9 parts |
| Methyl ethyl ketone | 70 parts |
| Toluene | 60 parts |
| Cyclohexanone | 5 parts |
| Bis(dioctylpyrophosphate)ethylene titanate | 1.5 parts |

To the resulting mixture, 5 parts of Collonate L was added, and the mixture was further stirred to provide a magnetic mix. The mix was applied uniformly to one side of a polyethylene terephthalate film as in Comparative Example 5 to give a dry thickness of 5 μm. The web was then dried and supercalendered. The so treated web was slit to 12.65 mm wide and shaped into video tape sample No. R-6.

COMPARATIVE EXAMPLES 7 TO 9

Ferromagnetic Fe-Co-Ni particles were thoroughly mixed in a ball mill with the following components in the amounts indicated below.

| Fe—Co—Ni particles | 75 parts |
| "VAGH" | 5 parts |
| Estan 5701 | 9 parts |
| Methyl ethyl ketone | 70 parts |
| Toluene | 60 parts |
| Cyclohexanone | 5 parts |
| Tetra(2,2-diallyloxymethyl-1-butyl)bis-(ditridecylphosphite)titanate | 1.5 parts |

To the resulting mixture, 5 parts of Collonate L was added, and the mixture was further stirred to provide a magnetic mix. The mix was applied uniformly to one side of a polyethylene terephthalate film as in Comparative Example 6 so as to give a dry thickness of 5 μm. The web was then dried and supercalendered. The so treated web was slit to 12.65 mm wide and shaped into video tape sample No. R-7. (Comparative Example 7). Video tape samples No. R-8 and R-9 (Comparative Examples 8 and 9) were prepared by repeating the same procedure except that tetra(2,2-diallyloxymethyl-1-butyl)bis(ditridecylphosphite)titanate was replaced by tetra(isopropoxy)bis(dioctadecylphosphite)titanate and tetra(2,2-dipropyloxymethyl-1-butyl)bis(ditridecylphosphite)titanate, respectively.

COMPARATIVE EXAMPLE 10

Ferromagnetic Co-coated gamma-$Fe_2O_3$ particles were thourhghly mixed in a ball mill with the following components in the amounts indicated below.

| Co—coated gamma-$Fe_2O_3$ particles | 75 parts |
| "VAGH" | 5 parts |
| Estan 5701 | 9 parts |
| Methyl ethyl ketone | 70 parts |
| Cyclohexanone | 5 parts |

To the resulting mixture, 5 parts of Collonate L was added, and the mixture was further stirred to provide a magnetic mix. The mix was applied to one side of a polyethylene terephthalate film base (12 μm thick) to give a dry coating thickness of 5 μm while the web was placed in a magnetic field of 2,000 gauss. The web was then dried and supercalendered. The so treated web was slit to 12.65 mm wide and shaped into video tape sample No. R-10.

COMPARATIVE EXAMPLE 11

Ferromagnetic particles of Co-coated gamma-$Fe_2O_3$ were mixed thoroughly in a ball mill with the following components in the amounts indicated below.

| Co—coated gamma-$Fe_2O_3$ particles | 75 parts |
| "VAGH" | 5 parts |
| Estan 5701 | 9 parts |
| Methyl ethyl ketone | 70 parts |
| Cyclohexanone | 5 parts |
| Bis(dioctylpyrophosphate)ethylene titanate | 1.5 parts |

To the resulting mixture, 5 parts of Collonate L was added, and the mixture was further stirred to provide a magnetic mix. The mix was applied to one side of a polyethylene terephthalate film (12 μm thick) to give a dry coating thickness of 5 μm while the web was placed in a magnetic field of 2,000 gauss. The web was then dried and supercalendered. The so treated web was slit to 12.65 mm wide and shaped into video tape sample No. R-11.

COMPARATIVE EXAMPLES 12 TO 14

Ferromagnetic particles of Co-coated gamma-$Fe_2O_3$ were thoroughly mixed in a ball mill with the following components in the amounts indicated below.

| Co—coated gamma-$Fe_2O_3$ particles | 75 parts |
| "VAGH" | 5 parts |
| Estan 5701 | 9 parts |
| Methyl ethyl ketone | 70 parts |
| Tetra(2,2-diallyloxymethyl-1-butyl)bis-(ditridecylphosphite)titanate | 1.5 parts |

To the resulting mixture, 5 parts of Collonate L was added, and the mixture was further stirred to provide a magnetic mix. The mix was applied uniformly to one side of a polyethylene terephthalate film as in Comparative Example 11 so as to give a dry thickness of 5 μm. The web was then dried and supercalendered. The so treated web was slit to 12.65 mm wide and shaped into video tape sample No. R-12 (Comparative Example 12). Video tape samples No. R-13 and R-14 (Comparative Examples 13 and 14) were prepared by repeating the same procedure except that tetra(2,2-diallyloxymethyl- 1-butyl)bis(ditridecylphosphite) was replaced by tetra(isopropoxy)-bis(dioctadecylphosphite)titanate and tetra(2,2-dipropyloxymethyl-1-butyl)bis(ditridecylphosphite)titanate, respectively.

Samples No. S-1 to S-10 and Comparative Sample No. R-1 to R-14 were checked for the peeling strength of the magnetic layer, the dislodging of magnetic particles, attenuation of RF reproduction output and surface gloss. The results are shown in Table 3. The respective parameters were evaluated by the following methods.

(1) Peeling strength

An adhesive tape was attached to each sample and then pulled forcibly at an angle of 180°. The peeling strength of the magnetic layer on each sample was evaluated in terms of the separated area: ⊚ (no part of the magnetic layer was separated); o (partial separation occurred); Δ (the greater part of the magnetic layer was separated); and x (all part of the magnetic layer was separated).

(2) Dislodging of magnetic particles

Each sample tape 5 m long was caused to reciprocate in contact with a mockup magnetic head for 5 hours at a speed of 7 m/sec. Thereafter, an adhesive tape was attached to the head and then peeled off. The amount of the magnetic particles transferred to the adhesive was checked both visually and under microscope: o (the particles could be observed only with a microscope); Δ (the particles were barely discernible by visual inspection); X (the particles were clearly discernible by visual inspection).

(3) Attenuation of RF reproduction output

Using each sample, the reproduction output of a testing VTR deck was measured for 5 hours at 4 MHz. The difference between the final and the initial reproduction outputs was measured in decibels.

(4) Surface gloss

The surface gloss of each sample for reflection at 60° was measured with a glossmeter GL-26D, and the results were indicated by relative values, with the reflectance at a standard sample (black tile) taken as 100%. The higher the values, the higher the gloss of the sample.

TABLE 1

| Sample No. | Peeling strength | Dislodging of ferromagnetic particles | Attenuation of RF reproduction output (dB) | Surface gloss (%) |
| --- | --- | --- | --- | --- |
| R-1 | Δ | Δ | −2 | 120 |
| S-1 | o | o | −1.0 | 150 |
| S-2 | ⊚ | o | −1.5 | 160 |
| S-3 | ⊚ | o | −0.5 | 180 |
| S-4* | ⊚ | o | −1.0 | 160 |
| S-5 | ⊚ | o | −0.5 | 180 |
| R-2 | x | x | −5.0 | 110 |
| R-3 | Δ | x | −4.0 | 140 |
| S-6 | o | o | −2.0 | 170 |
| S-7 | ⊚ | o | −1.5 | 180 |
| S-8 | ⊚ | o | −1.0 | 200 |
| S-9 | ⊚ | o | −1.0 | 180 |
| S-10 | ⊚ | o | −0.5 | 200 |
| R-4 | x | x | −5.0 | 110 |
| R-5 | x | Δ | −4.0 | 110 |
| R-10 | Δ | Δ | −3.0 | 110 |
| R-11 | Δ | Δ | −3.0 | 115 |
| R-12 | Δ | Δ | −3.0 | 120 |
| R-9 | Δ | Δ | −3.0 | 110 |
| R-13 | x | x | −6.0 | 115 |
| R-14 | Δ | x | −5.0 | 115 |
| R-15 | Δ | x | −5.0 | 115 |
| R-16 | Δ | x | −5.0 | 120 |
| R-17 | Δ | x | −5.0 | 120 |

As is clear from Table 3, comparative samples No. R-7 to 14 which used magnetic layers containing ferromagnetic Co-coated gamma-$Fe_2O_3$ or Fe-Co-Ni particles that were incorporated with the titanate coupling agent in the presence of a polyurethane resin used in combination with resins other than nitrocellulose (e.g. vinyl chloride/vinyl acetate copolymer) were inferior to the samples that used the combination of the polyurethane resin and nitrocellulose. The same tendency was observed with the comparative samples using other ferromagnetic materials in the magnetic layer.

Comparative sample No. R-1 used a binder made of both nitrocellulose and urethane resin but did not use a titanate coupling agent. This sample was again inferior to samples No. S-1 to S-5 using the titanate coupling agent.

Comparative samples No. R-2, 4 and 6 used titanate coupling agents that were incorporated in a binder made of both nitrocellulose and polyurethane resin. However, these coupling agents did not 6 ligands, nor did they have the formula:

$$(R^1-O)_{\overline{4}}Ti.[(P(OR^2)_2OH)]_2$$

(wherein $R^1$ is a straight or branched aliphatic hydrocarbon residue; $R^2$ is a straight or branched aliphatic or aromatic hydrocarbon residue. The results in Table 3 show that comparative samples No. R-2, 4 and 6 using these titanate coupling agents were inferior to comparative samples No. R-10 to R-14 using the titanate coupling agents satisfying the two additional requirements.

COMPARATIVE EXAMPLE 15

Ferromagnetic particles of Co-coated gamma-$Fe_2O_3$ were thoroughly mixed in a ball mill with the following components in the amounts indicated below.

| | |
| --- | --- |
| Co—coated gamma-$Fe_2O_3$ particles | 75 parts |
| Estan 5701 | 9 parts |
| "VAGH" | 5 parts |
| Methyl ethyl ketone | 70 parts |
| Toluene | 60 parts |
| Cyclohexanone | 5 parts |

To the resulting mixture, 5 parts of Collonate L was added, and the mixture was further stirred to provide a magnetic mix. The mix was applied to one side of a polyethylene terephthalate film (15 μm thick) to give a dry coating thickness of 5 μm while the web was placed in a magnetic field of 2,000 gauss. The web was then dried and supercalendered. The so treated web was slit to 12.65 mm wide and shaped into video tape sample No. R-15.

COMPARATIVE EXAMPLES 16 TO 20

Comparative samples No. R-16 to R-20 were prepared as in Comparative Example 15 except that the following titanate coupling agents were incorporated in an amount of 1.5 parts.

| | |
| --- | --- |
| Isopropyltridecylbenzenesulfonyl titanate | (No. R-16) |
| Tetraundecylbis(diphenetylphosphite)titanate | (No. R-17) |
| $(C_{11}H_{23}O)_{\overline{4}}Ti.[P(OCH_2CH_2$ 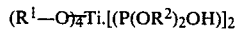 $)_2OH]_2$ | |
| Tetraisopropylbis(dioctylphosphite)titanate | (No. R-18) |

-continued

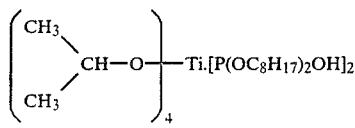

Tetraoctylbis(ditridecylphosphite)titanate (No. R-19)
$(C_8H_{17}-O)_2Ti.[P(OC_{13}H_{27})_2OH]_2$ Tetra(2,2-dipropyloxy-methyl-1-butyl)bis- (No. R-20)
(ditridecylphosphite)titanate

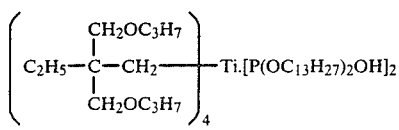

COMPARATIVE EXAMPLES 21 TO 26

Comparative samples No. R-21 to R-26 were prepared as in Comparative Examples 15 to 20 except that the ferromagnetic particles of Co-coated gamma-$Fe_2O_3$ were replaced by ferromagnetic metal particles.

COMPARATIVE EXAMPLES 27 AND 28

Comparative samples No. R-27 and 28 were prepared as in Comparative Examples 15 and 16, respectively, except that "VAGH" was replaced by Epikote 1004 (epoxy resin of Shell Chemical Co.).

EXAMPLES 11 TO 14

Sample Nos. S-11 to S-14 were prepared as in Comparative Examples 17 to 20, respectively, except that "VAGH" was replaced by Epikote 1004.

COMPARATIVE EXAMPLES 29 AND 30

Comparative samples No. R-29 and 30 were prepared as in Comparative Examples 15 and 16, respectively, except that "VAGH" was replaced by Araldite 6084 (epoxy resin of Ciba-Geigy Corporation).

EXAMPLES 15 TO 18

Sample Nos. S-15 to S-18 were prepared as in Comparative Examples 17 to 20, respectively, except that "VAGH" was replaced by Araldite 6084.

COMPARATIVE EXAMPLES 31 AND 32

Comparative samples No. R-31 and 32 were prepared as in Comparative Examples 15 and 16, respectively, except that "VAGH" was replaced by STX-04 (phenoxy resin of Toto Kasei K.K.).

EXAMPLES 19 TO 22

Sample Nos. S-19 to S-22 were prepared as in Comparative Examples 17 to 20, respectively, except that "VAGH" was replaced by STX-04.

COMPARATIVE EXAMPLES 33 AND 34

Comparative samples No. R-33 and 34 were prepared as in Comparative Examples 15 and 16, respectively, except that "VAGH" was replaced by PKHH (Phenoxy resin of Union Carbide Corporation).

EXAMPLES 23 TO 26

Sample Nos. S-23 to S-26 were prepared as in Comparative Examples 17 to 20, respectively, except that "VAGH" was replaced by PKHH.

COMPARATIVE EXAMPLES 35 AND 36

Comparative samples No. R-35 and 36 were prepared as in Comparative Examples 27 and 28, respectively, except that the ferromagnetic particles of Co-coated gamma-$Fe_2O_3$ were replaced by ferromagnetic metal particles.

EXAMPLES 27 TO 30

Sample Nos. S-27 to S-30 were prepared as in Comparative Examples 11 to 14, respectively, except that the ferromagnetic particles of Co-coated gamma-$Fe_2O_3$ were replaced by ferromagnetic metal particles.

COMPARATIVE EXAMPLES 37 AND 38

Comparative samples No. R-37 and 38 were prepared as in Comparative Examples 29 and 30, respectively, except that the ferromagnetic particles of Co-coated gamma-$Fe_wO_3$ were replaced by ferromagnetic metal particles.

EXAMPLES 31 TO 34

Sample Nos. S-31 to S-34 were prepared as in Examples 15 to 18, respectively, except that the ferromagnetic particles of Co-coated gamma-$Fe_2O_3$ were replaced by ferromagnetic metal particles.

COMPARATIVE EXAMPLES 39 AND 40

Comparative samples No. R-39 and 40 were prepared as in Comparative Examples 31 and 32, respectively, except that the ferromagnetic particles of Co-coated gamma-$Fe_2O_3$ were replaced by ferromagnetic metal particles.

EXAMPLES 35 TO 38

Sample Nos. S-35 to S-38 were prepared as in Examples 19 to 22, respectively, except that the ferromagnetic particles of Co-coated gamma-$Fe_2O_3$ were replaced by ferromagnetic metal particles.

COMPARATIVE EXAMPLES 41 AND 42

Comparative samples No. R-41 and 42 were prepared as in Comparative Examples 33 and 34, respectively, except that the ferromagnetic particles of Co-coated gamma-$Fe_2O_3$ were replaced by ferromagnetic metal particles.

EXAMPLES 39 TO 42

Sample Nos. S-39 to S-42 were prepared as in Examples 23 to 26, respectively, except that the ferromagnetic particles Co-coated gamma-$Fe_2O_3$ were replaced by ferromagnetic metal particles.

The wear resistance (as indicated by the dislodging of magnetic particles) and the attenuation of RF reproduction output of each sample and comparative sample were evaluated in the same manner as described above, and the results are shown in Table 4. These two evaluations were made both before and after aging at 70° C. and 80% R.H. for two weeks. The eight alphabets used in the column of "wear resistance" have the following meanings: A . . . excellent, B . . . very good, C . . . good, D . . . fair, E . . . rather poor, F . . . poor, G . . . very poor, H . . . worst.

TABLE 4

| Sample No. | Wear resistance before aging | Wear resistance after aging | Attenuation of RF reproduction output (dB) before aging | Attenuation of RF reproduction output (dB) after aging |
|---|---|---|---|---|
| R-15 | E | H | −2 | −5 |
| R-16 | C | G | −1 | −4 |
| R-17 | E | G | −1 | −3 |
| R-18 | C | F | −1 | −3 |
| R-19 | C | F | −1 | −3 |
| R-20 | C | F | −1.5 | −4 |
| R-21 | F | H | −4 | −9 |
| R-22 | E | H | −2 | −5 |
| R-23 | E | H | −1.0 | −4.5 |
| R-24 | C | F | −1.5 | −4 |
| R-25 | C | F | −1.5 | −4 |
| R-26 | C | F | −2 | −5 |
| R-27 | E | H | −2 | −5 |
| R-28 | C | H | −1 | −3 |
| S-11 | C | E | −1 | −2 |
| S-12 | C | D | 0 | −2 |
| S-13 | C | D | −0.5 | −1.5 |
| S-14 | C | D | −1.0 | −1.5 |
| R-29 | E | H | −2 | −5 |
| R-30 | C | F | −1 | −2.5 |
| S-15 | C | D | −1 | −2 |
| S-16 | C | D | −0.5 | −2 |
| S-17 | C | D | −0.5 | −2 |
| S-18 | C | D | −1.0 | −2 |
| R-31 | E | H | −2 | −5 |
| R-32 | C | F | −1 | −2.5 |
| S-19 | C | D | −1 | −1.5 |
| S-20 | B | C | 0 | −0.5 |
| S-21 | B | C | −0.5 | −1 |
| S-22 | C | D | −0.5 | −1.5 |
| R-33 | E | H | −2 | −5 |
| R-34 | C | F | −1 | −2 |
| S-23 | C | D | −1 | −1.5 |
| S-24 | A | C | 0 | −0.5 |
| S-25 | C | C | −0.5 | −1 |
| S-26 | C | D | −1 | −2 |
| R-35 | F | H | −4 | −10 |
| R-36 | F | H | −2 | −4 |
| S-27 | D | D | −1.5 | −3 |
| S-28 | C | D | −1 | −3.5 |
| S-29 | C | D | −1 | −4 |
| S-30 | D | D | −2 | −5 |
| R-37 | F | H | −4 | −9 |
| R-38 | E | F | −2 | −4.5 |
| S-31 | D | D | −1.5 | −4 |
| S-32 | C | D | −1 | −3 |
| S-33 | C | D | −1 | −3.5 |
| S-34 | D | D | −1.5 | −4 |
| R-39 | F | H | −4 | −9 |
| R-40 | E | F | −2 | −3.5 |
| S-35 | D | D | −1.5 | −2.5 |
| S-36 | C | C | −1 | −1 |
| S-37 | C | C | −1 | −1.5 |
| S-38 | C | D | −1.5 | −2.5 |
| R-41 | F | H | −4 | −8 |
| R-42 | E | F | −2 | −3 |
| S-39 | D | D | −2 | −2.5 |
| S-40 | C | C | −1 | −1 |
| S-41 | C | C | −1 | −1.5 |
| S-42 | D | D | −1.5 | −2.5 |

Sample Nos. 11 to 42 according to the present invention used binders made of both a polyurethane resin and an epoxy resin in the presence of titanate coupling agents having 6 ligands. As is clear from the data in Table 4, these samples were more wear-resistant and had a lower attenuation in RF reproduction output than the comparative samples which used a polyurethane resin in combination with resins other than epoxy or phenoxy resin, or which used titanate coupling agents having 4 ligands. The comparative samples using no titanate coupling agent were so poor in performance that they could not be put to actual practice.

Equally good or better results were obtained when ferromagnetic particles whose surface was preliminarily treated with the tintanate coupling agent having 6 ligands were directly mixed with the other components of a magnetic mix. In one preferred embodiment, one part of the titanate coupling agent having 6 ligands was dissolved in 500 cc of toluene; 100 parts of ferromagnetic particles was dispersed in the solution; the dispersion was then filtered, dried first with air, then under vacuum to thereby prepare the surface-treated ferromagnetic particles. A small amount of these ferromagnetic particles was subjected to a flushing test in a water-toluene medium in order to see into which of the two solvent phases, aqueous or organic, the ferromagnetic particles would be transferred more easily or in a greater amount. In this flushing test, all the surface-treated particles were transferred into the organic layer whereas untreated ferromagnetic particles remained in the aqueous layer. This indicates the effectiveness of the preliminary surface-treatment of the ferromagnetic particles with the titanate coupling agent for increasing the hydrophobicity of the particle's surface.

If the surface-treated ferromagnetic particles are used, a new supply of the titanate coupling agent need not be added to the magnetic mix.

What is claimed is:

1. A magnetic recording medium comprising a non-magnetic substrate, a magnetic layer comprising ferromagnetic particles, a binder group, and a titanate coupling agent, said binder group consisting at least one polyurethane resin and at least one of a nitrocellulose resin and an epoxy resin, and wherein said titanate coupling agent has 6 ligands, each of said ligands being free of ethylenically unsaturated double bonds.

2. A magnetic recording medium according to claim 1, wherein said ferromagnetic particles are preliminarily treated with said titanate coupling agent.

3. A magnetic recording medium according to claim 1, wherein said ferromagnetic particles are metallic particles having ferromagnetic properties.

4. A magnetic recording medium according to claim 3, wherein said metallic particles have iron as the main component.

5. A magnetic recoding medium according to claim 1, wherein said ferromagnetic particles are iron oxide particles.

6. A magnetic recording medium according to claim 5, wherein said iron oxide particles are Co-containing iron oxide particles.

7. A magnetic recording medium according to claim 5, wherein said Co-containing iron oxide particles are Co-containing gamma-$Fe_2O_3$ particles.

8. A magnetic recording medium according to claim 1, wherein said binder group contains at least a nitrocellulose resin and a polyurethane resin.

9. A magnetic recording medium according to claim 8, wherein said ferromagnetic particles are selected from Co-containing iron oxide and metallic particles having ferromagnetic properties.

10. A magnetic recording medium according to claim 8, wherein said ferromagnetic particles are preliminarily treated with said titanate coupling agent.

11. A magnetic recording medium according to claim 8, wherein said titanate coupling agent is represented by the following formula:

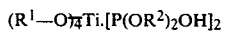

wherein $R^1$ is a straight or branched aliphatic hydrocarbon residue and $R^2$ is a straight or branched aliphatic or aromatic hydrocarbon residue.

12. A magnetic recording medium according to claim 11, wherein said $R^1$ is a branched aliphatic hydrocarbon residue.

13. A magnetic recording medium according to claim 11, wherein said $R^1$ is an aliphatic hydrocarbon residue having a total of 3 to 18 carbon atoms, and said $R^2$ is an aliphatic hydrocarbon residue having a total of 6 to 20 carbon atoms.

14. A magnetic recording medium according to claim 1, wherein said binder group contains at least an epoxy resin and a polyurethane resin.

15. A magnetic recording medium according to claim 14, wherein said titanate coupling agent is represented by the following formula:

$$(R^1-O)_2Ti.[P(OR^2)_2OH]_2$$

wherein $R^1$ is a straight or branched aliphatic hydrocarbon residue and $R^2$ is a straight or branched aliphatic or aromatic hydrocarbon residue.

16. A magnetic recording medium according to claim 15, wherein said $R^1$ is a branched aliphatic hydrocarbon residue.

17. A magnetic recording medium according to claim 15, wherein said $R^1$ is an aliphatic hydrocarbon residue having a total of 3 to 18 carbon atoms, and said $R^2$ is an aliphatic hydrocarbon residue having a total of 6 to 20 carbon atoms.

18. A magnetic recording medium according to claim 14, wherein said ferromagnetic particles are preliminarily treated with said titanate coupling agent.

19. A magnetic recording medium according to claim 14, wherein said epoxy resin is a phenoxy resin.

20. A magnetic recording medium according to claim 19, wherein said ferromagnetic particles are selected from metallic particles having ferromagnetic properties.

21. A magnetic recording medium according to claim 19, wherein said ferromagnetic particles are Co-containing iron oxide particles.

22. A magnetic recording medium according to claim 19, wherein said ferromagnetic particles are preliminarily treated with said titanate coupling agent.

* * * * *